United States Patent
Li et al.

(10) Patent No.: US 9,609,310 B2
(45) Date of Patent: Mar. 28, 2017

(54) APPARATUS AND CONTROL METHOD FOR STEREOSCOPIC DISPLAY USING VIEWER'S POSITION INFORMATION

(71) Applicant: SuperD Co. Ltd., Shenzhen (CN)

(72) Inventors: Xiaoming Li, Shenzhen (CN); Lei Song, Shenzhen (CN); Ning Liu, Shenzhen (CN); Zhang Ge, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 684 days.

(21) Appl. No.: 14/011,827

(22) Filed: Aug. 28, 2013

(65) Prior Publication Data

US 2014/0063207 A1    Mar. 6, 2014

(30) Foreign Application Priority Data

Aug. 31, 2012 (CN) .......................... 2012 1 0318684

(51) Int. Cl.
*H04N 13/04* (2006.01)

(52) U.S. Cl.
CPC ..... *H04N 13/0402* (2013.01); *H04N 13/0404* (2013.01); *H04N 13/0409* (2013.01); *H04N 13/0477* (2013.01)

(58) Field of Classification Search
CPC ........... H04N 13/0404; H04N 13/0402; H04N 13/0477; H04N 13/0409; H04N 13/0497; H04N 13/0422; G02B 27/2214
See application file for complete search history.

(56) References Cited

U.S. PATENT DOCUMENTS

| | | | | |
|---|---|---|---|---|
| 5,777,720 A | * | 7/1998 | Shapiro | G02B 27/0093 348/E13.022 |
| 6,049,424 A | * | 4/2000 | Hamagishi | G02B 27/2214 345/419 |
| 2004/0178969 A1 | * | 9/2004 | Zhang | H04N 13/0409 345/6 |
| 2005/0078370 A1 | * | 4/2005 | Nishihara | G02B 27/2214 359/464 |
| 2005/0190443 A1 | * | 9/2005 | Nam | G02B 27/2214 359/464 |
| 2007/0258139 A1 | * | 11/2007 | Tsai | G02B 27/2214 359/462 |
| 2009/0041386 A1 | * | 2/2009 | Mealy | B41J 3/36 382/298 |
| 2011/0006979 A1 | * | 1/2011 | Min | G02B 27/0093 345/156 |

(Continued)

FOREIGN PATENT DOCUMENTS

| | | |
|---|---|---|
| CN | 2911717 Y | 6/2007 |
| CN | 102033324 A | 4/2011 |
| CN | 102447929 A | 5/2012 |

*Primary Examiner* — Mohammed Jebari

(74) *Attorney, Agent, or Firm* — Anova Law Group, PLLC

(57) ABSTRACT

A method is provided for controlling stereoscopic display. The method includes a collection device obtaining a position variation between a space position of a viewer at the current time and a space position of the viewer at the previous time, wherein the position variation is an offset of parallel translation of the space position of the viewer relative to a display panel. The method also includes an adjusting device adjusting a stereoscopic display apparatus based on the space position of the viewer at the current time and the position variation.

6 Claims, 5 Drawing Sheets

(56) References Cited

U.S. PATENT DOCUMENTS

| | | | | |
|---|---|---|---|---|
| 2011/0096070 A1* | 4/2011 | Yen | ............ | G02B 27/2214 345/419 |
| 2011/0096152 A1* | 4/2011 | Hsu | ............ | G02B 27/2214 348/51 |
| 2011/0221750 A1* | 9/2011 | Sato | ............ | G02B 27/2214 345/419 |
| 2011/0310003 A1* | 12/2011 | de la Barre | ........ | H04N 13/0402 345/156 |
| 2011/0310092 A1* | 12/2011 | de la Barre | ........ | H04N 13/0409 345/419 |
| 2011/0316985 A1* | 12/2011 | Ishikawa | ............ | G02B 27/2214 348/51 |
| 2012/0038634 A1* | 2/2012 | Cha | ............ | H04N 13/0404 345/419 |
| 2012/0050268 A1* | 3/2012 | Kim | ............ | H04N 13/0497 345/419 |
| 2012/0229431 A1* | 9/2012 | Hiroki | ............ | G09G 3/003 345/204 |
| 2012/0320170 A1* | 12/2012 | Lee | ............ | G02B 27/2214 348/54 |
| 2012/0320171 A1* | 12/2012 | Lee | ............ | G02B 27/2214 348/54 |
| 2013/0009859 A1* | 1/2013 | Woo | ............ | G02B 27/2214 345/156 |
| 2013/0127832 A1* | 5/2013 | Lee | ............ | H04N 13/0404 345/419 |

* cited by examiner

APPARATUS AND CONTROL METHOD FOR STEREOSCOPIC DISPLAY USING VIEWER'S POSITION INFORMATION

CROSS-REFERENCES TO RELATED APPLICATIONS

This application claims priority of Chinese Patent Application No. 201210318684.0, filed on Aug. 31, 2012, the entire contents of which are incorporated by reference herein.

FIELD OF THE INVENTION

The present invention generally relates to the field of stereoscopic display, more particularly, to an apparatus and method for controlling stereoscopic display.

BACKGROUND

Auto-stereoscopic display technologies have become an inevitable trend in development of stereoscopic display technologies, and auto-stereoscopic display apparatuses are basic carriers of the auto-stereoscopic display technologies. The principle of auto-stereoscopic display apparatus is to set a grating in front of a display panel, i.e. a slit grating. For example, at least two parallax images displayed on a display panel are directed separately to the left and right eye viewing area of a viewer through the slit grating, and then fused into a three dimensional (3D) stereoscopic image through the optic center of the viewer. There is a need to improve viewers' experience using tracking technology to solve the periodic defect issue of dynamic gratings.

The disclosed apparatus and method are directed to solve one or more problems set forth above and other problems.

BRIEF SUMMARY OF THE DISCLOSURE

One aspect of the present disclosure includes a method for controlling stereoscopic display. The method includes a collection device obtaining a position variation between a space position of a viewer at the current time and a space position of the viewer at the previous time, wherein the position variation is an offset of parallel translation of the space position of the viewer relative to a display panel. The method also includes an adjusting device adjusting a stereoscopic display apparatus based on the space position of the viewer at the current time and the position variation.

Another aspect of the present disclosure includes a stereoscopic display apparatus. The apparatus includes a display panel, a collection device, a processing device, and an adjusting device. The display panel is configured to display images. The collection device is configured to obtain viewers' position information and a deflection angle of the display panel and provide the obtained position information and deflection angle to the processing device. The processing device is configured to obtain a position variation between a space position of a viewer at the current time and the space position of the viewer at the previous time by using the collection device, wherein the position variation is an offset of parallel translation of the viewer's space position relative to the display panel. The adjusting device is configured to, based on the viewer's space position at the current time and the position variation, adjust the stereoscopic display apparatus.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions of the present invention, the figures which are needed to be used in the description of the present invention are briefly described in the following. The figures in the following description are only embodiments of the present invention, and it can be easy for those skilled in the art to obtain other figures based on the following figures without creative work.

DETAILED DESCRIPTION

Reference will now be made in detail to exemplary embodiments of the invention, which are illustrated in the accompanying drawings.

When a position of 3D display apparatus relative to a space position of a viewer changes, display screen of 3D display apparatus produces a continuous partial or full virtual image (i.e., jitter), reducing stereoscopic viewing effect. Through experiments, it can be found that that when the sampling frequency of a collection device is relatively low, or the time for changing space position is relatively short, jitter phenomenon is more apparent. Thus, when stereoscopic display apparatus is adjusted based on tracking data, not only the current space position of the viewer, but also a variation of the current space position relative to the previous space position (including a variation direction and a variation value) should be considered, thus reducing the "jitter" phenomenon of stereoscopic image and improving the viewer's viewing effect.

Figure 1:
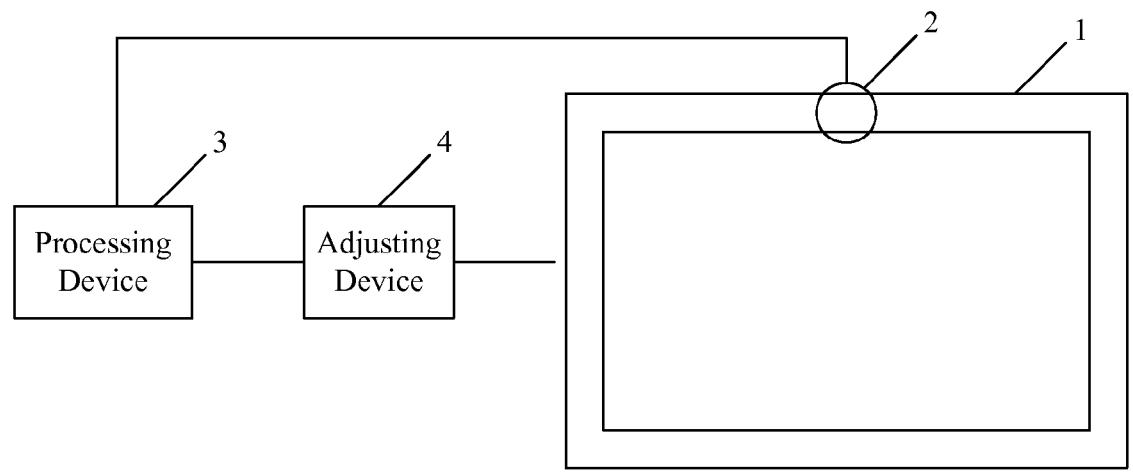
FIG. 1 illustrates a structure diagram of an exemplary stereoscopic display apparatus consistent with the disclosed embodiments.

FIG. 1 illustrates a structure diagram of an exemplary stereoscopic display apparatus consistent with the disclosed embodiments. As shown in FIG. 1, the stereoscopic display apparatus may include a display panel 1, a collection device 2, a processing device 3, and an adjusting device 4. Other components may be added and certain devices may be omitted without departing from the principles of the disclosed embodiments.

The display panel 1 is configured to display images. The display panel 1 may include any appropriate device with a high refreshing rate for displaying images, such as a plasma display panel (PDP) display, a cathode ray tube (CRT) display, a liquid crystal display (LCD), an organic light emitting diode (OLED) display, and other types of displays. In order to achieve 3D display effect, a dynamic slit grating may be set on the surface of the display panel 1.

The collection device 2 may be an image acquiring device and/or a direction sensor. The image acquiring device may obtain an image sequence of the viewer and provide the obtained image sequence to the processing device 3. The image acquiring device may include any appropriate device for capturing real-time data of viewers' position information, such as one or more cameras or webcams. The direction sensor may obtain a deflection angle of the display panel 1 and provide the deflection angle to the processing device 3.

The processing device 3 is configured to obtain a position variation between the space position of the viewer at the current time and the space position of the viewer at the previous time by using the collection device 2. The position variation is an offset of parallel translation of the viewer's space position relative to the display panel 1. In addition, the processing device 3 can also obtain a variation of viewing distance, that is, an offset of the distance between the viewer and the display panel.

Further, the adjusting device 4 is configured to, based on the viewer's space position at the current time and the position variation, adjust the stereoscopic display apparatus, including adjustment of a spectral device or image arranging units. The adjusting device 4 may be controlled by the processing device 3.

Figure 9:
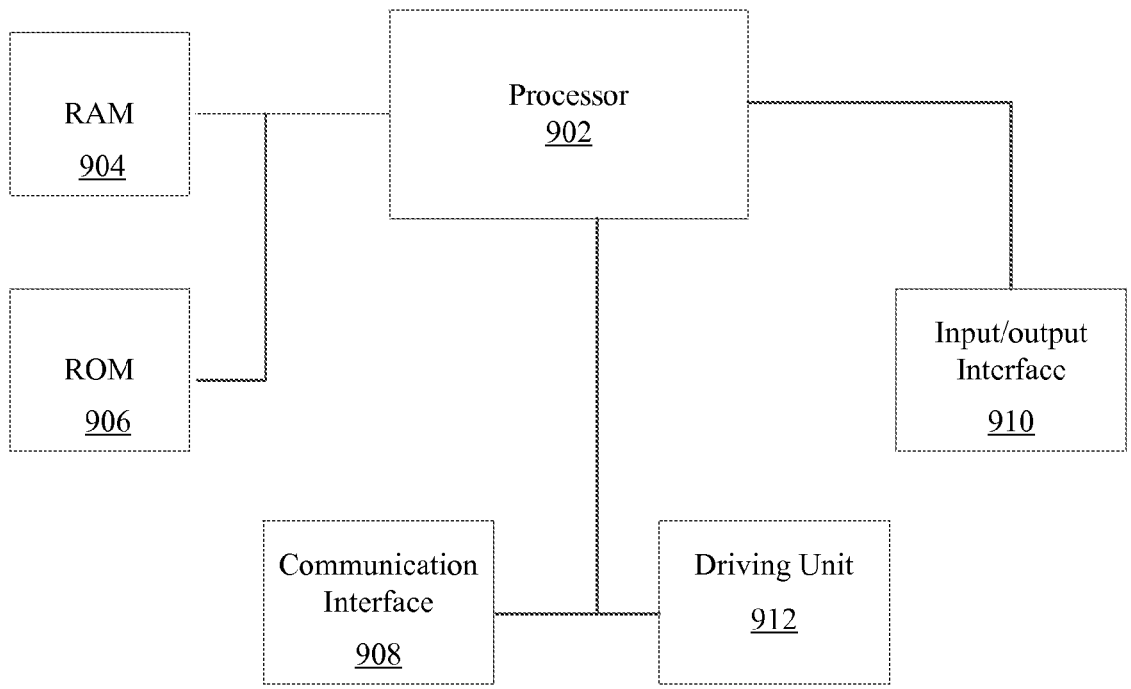
FIG. 9 illustrates a block diagram of an exemplary processing device consistent with the disclosed embodiments.

Processing device 3 and/or adjusting device 4 may be implemented by any appropriate process-based system. FIG. 9 illustrates a block diagram of an exemplary processor-based system.

As shown in FIG. 9, the processor-based system may include a processor 902, a random access memory (RAM) unit 904, a read-only memory (ROM) unit 906, a communication interface 908, an input/output interface unit 910, and a driving unit 912. Other components may be added and certain devices may be removed without departing from the principles of the disclosed embodiments.

Processor 902 may include any appropriate type of graphic processing unit (GPU), general-purpose microprocessor, digital signal processor (DSP) or microcontroller, and application specific integrated circuit (ASIC), etc. Processor 902 may execute sequences of computer program instructions to perform various processes associated with display system. The computer program instructions may be loaded into RAM 904 for execution by processor 902 from read-only memory 906. Random access memory (RAM) unit 904 and Read-only memory (ROM) unit 906 may also be used for storing an operating system ensuring normal working of the processing device (for example, Windows/Unix/Linux/Mac X/mobile platform operating system). The action of the operating system is to provide the basic interface and function library for various algorithms and application software.

Communication interface 908 may provide communication connections such that display system may be accessed remotely and/or communicate with other systems through computer networks or other communication networks via various communication protocols, such as transmission control protocol/internet protocol (TCP/IP), hypertext transfer protocol (HTTP), etc.

Input/output interface 910 may be provided for the viewers to input information into 3D display apparatus or for the viewers to receive information from 3D display apparatus. For example, input/output interface 910 may include any appropriate input device, such as a remote control, a keyboard, a mouse, an electronic tablet, voice communication devices, or any other optical or wireless input devices. Input/output interface 910 may also include an output port of a personal computer (for example, USB, serial port, DVI or LVDS) and a chip for processing port protocol and transmitting data. Further, driving unit 912 may include any appropriate driving circuitry to drive various devices, such as the display unit and other optical devices.

Returning to FIG. 1, during operation, 3D display apparatus (e.g., processor 902) may perform certain processes to obtain a position variation and/or a variation of viewing distance.

For example, when the collection device 2 is an image acquiring device, to achieve a continuous tracking for the viewer and a continuous adjustment for the stereoscopic image, the collection device 2 may collect the image sequence of the viewer via a video camera. The video camera should be able to acquire a smooth image sequence. The position information of the viewer determined by the processing device 3 via computing is more accurate and continuous if the continuity of the acquired image sequence is better. The processing device 3 can determine the space position of the viewer based on the image sequence obtained by the image acquiring device.

Specifically, the processing device 3 may process the image sequence by using face tracking technology. That is, an image position of the viewer may be found via face matching or head feature to a frame of image from the video camera, and may be transformed into a space position according to inner parameters of the video camera, thus obtaining the viewer's space position. The image acquiring device may be located at the axial position of the display panel 1, so that the image position of the viewer is easily transformed into the space position.

In addition, the collection device 2 implements continuous sampling based on a certain frequency, therefore the processing device 3 can obtain space positions of the viewer at different times. As used herein, the space position refers to coordinates of a lateral movement (i.e., left movement or right movement) of a viewer relative to a plane parallel to the display panel 1. For example, if the position coordinate of the central axis of the display panel 1 is 0 and width of the display panel 1 is 200, the coordinate of the space position is −100 when the viewer is on the most left side of the display panel 1, and the coordinate of the space position is +100 when the viewer is on the most right side of the display panel 1.

After the processing device 3 obtains the space position $C_{pos}$ of the viewer at the current time and the space position $P_{pos}$ of the viewer at the previous time, the processing device 3 can obtain a position variation $\Delta$ between $C_{pos}$ and $P_{pos}$ by Formula (1):

$$\Delta = C_{pos} - P_{pos} \tag{1}$$

As shown in Formula (1), the position variation is an offset of parallel translation of the space position of a viewer relative to the display panel 1, including a variation direction (reflected by positive sign and negative sign) and a variation value.

When a viewer uses the 3D display apparatus, the viewer may rotate the display panel 1. After the display panel 1 is rotated, the space position of the viewer relative to the display panel 1 is changed. Therefore, when the collection device 2 is a direction sensor (e.g., a gyroscope), the direction sensor may implement continuous sampling to obtain deflection angles of the display panel 1 at different times based on a certain frequency. After the processing device 3 obtains deflection angle $C_{angle}$ of the display panel 1 at the present time and deflection angle $P_{angle}$ of the display panel 1 at the previous time, based on the difference between $C_{angle}$ and $P_{angle}$, the processing device 3 determines a position variation $\Delta$ between the space position of the viewer at the current time $C_{pos}$ and the space position of the viewer at the previous time $P_{pos}$.

Figure 2:
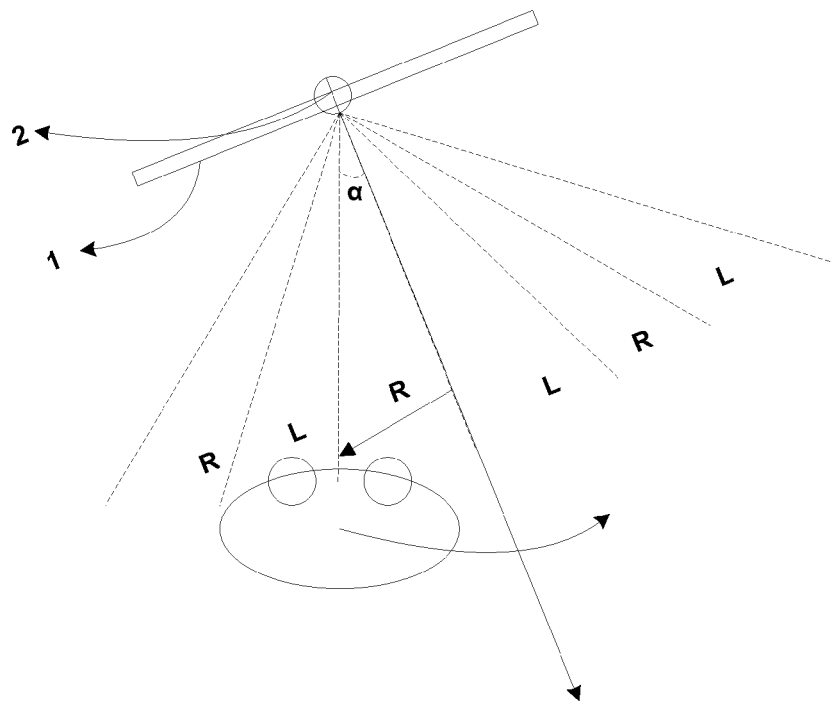
FIG. 2 illustrates a schematic diagram of an exemplary rotation of a display panel consistent with the disclosed embodiments.

FIG. 2 illustrates a schematic diagram of an exemplary rotation of a display panel consistent with the disclosed embodiments. As shown in FIG. 2, the position variation is calculated by Formulas (2) and (3):

$$\alpha = C_{angle} - P_{angle} \quad (2)$$

$$\Delta = (f+z) * \tan \alpha \quad (3)$$

where z represents a distance between the space position of the viewer at the current time and the slit grating of the stereoscopic display apparatus; f represents a distance between the slit grating and pixel plane of the display panel; and $\alpha$ represents a rotation angle. When the collection device 2 is an image acquiring device, z is obtained instantly based on the distance variation of the viewer relative to the display apparatus; when the collection device 2 is a direction sensor, z is set as a fixed value based on the parameters of the stereoscopic display apparatus.

The adjusting device 4 can adjust the stereoscopic display apparatus using two methods. For example, the adjusting device 4 may adjust electrodes that drive the dynamic slit grating of the spectral device. The adjusting device 4 may also adjust the image arranging units of the stereoscopic display image.

Figure 3:
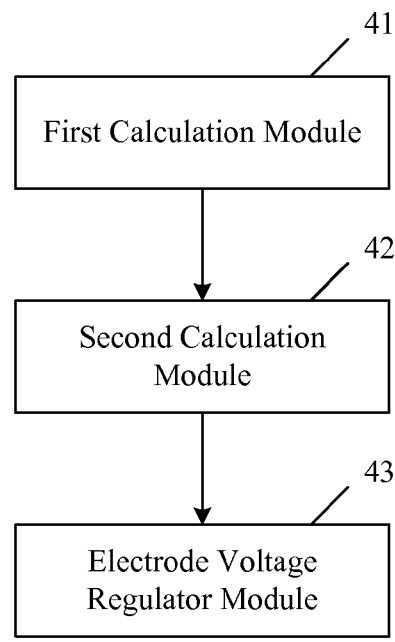
FIG. 3 illustrates a schematic diagram of an exemplary implementation of an adjusting device consistent with the disclosed embodiments.

FIG. 3 illustrates a schematic diagram of an exemplary implementation of an adjusting device consistent with the disclosed embodiments. As shown in FIG. 3, when the adjusting device 4 adjusts electrodes that drive the dynamic slit grating of spectral device, the adjusting device 4 may include a first calculation module 41, a second calculation module 42, and an electrode voltage regulator module 43.

The first calculation module 41 is configured to, based on the position variation of the viewer, calculate a total number of compensated electrodes in a slit grating period.

Figure 5:
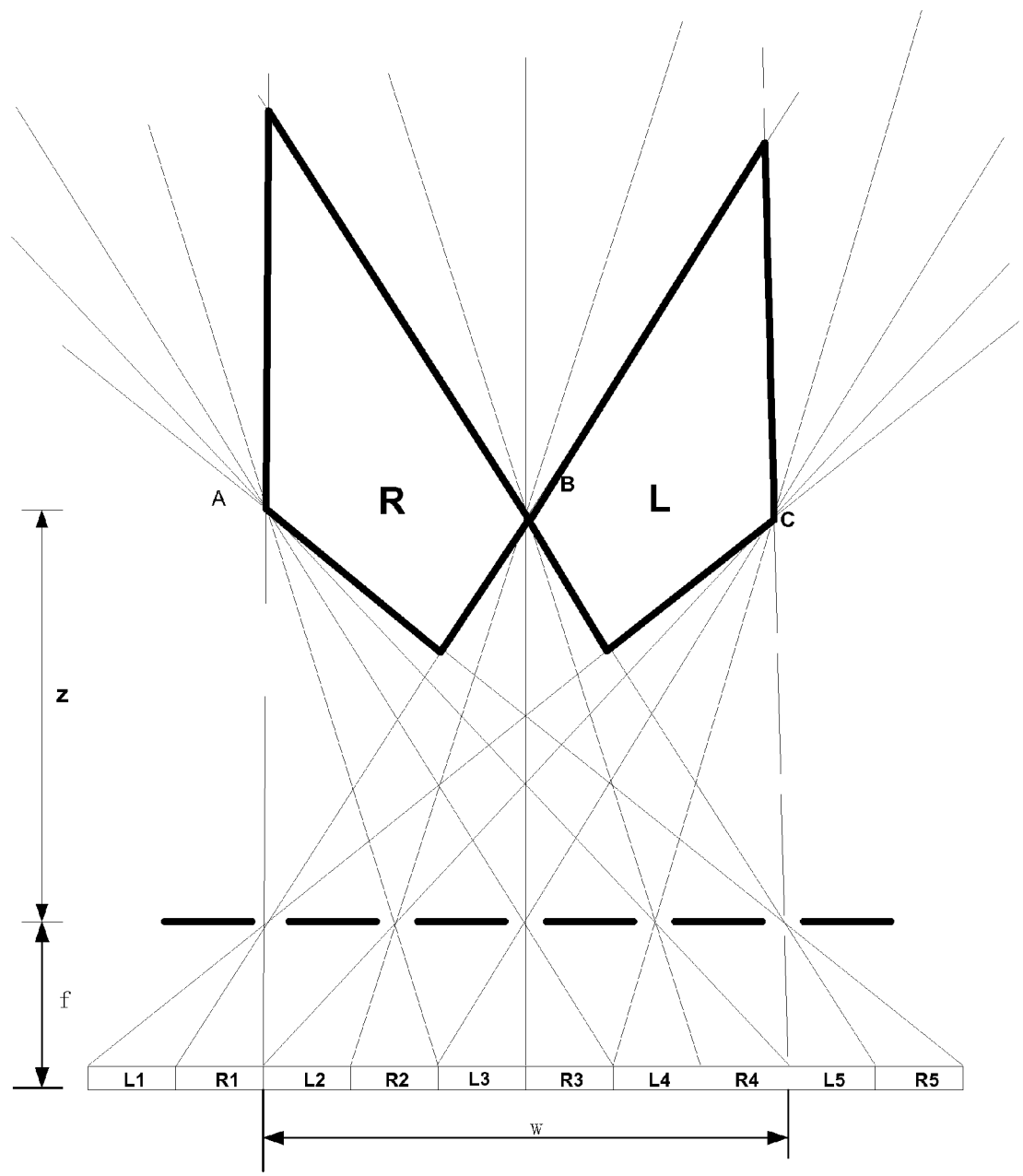
FIG. 5 illustrates a schematic diagram of an exemplary viewing zone of a stereoscopic display apparatus consistent with the disclosed embodiments.

FIG. 5 illustrates a schematic diagram of an exemplary viewing zone of a stereoscopic display apparatus consistent with the disclosed embodiments. As shown in FIG. 5, each label of Ln, Rn (n=1, 2, 3, 4, 5 ...) represents a display pixel on $n^{th}$ column of the display panel. L1, L2, L3, L4, and L5 are according to the first image (e.g., the left eye's image), and R1, R2, R3, R4, and R5 are according to the second image (e.g., the right eye's image). z represents the distance between the position of the viewer at the current time and the slit grating. f represents the distance between the slit grating and pixel plane of the display panel. w represents the width of a viewing zone. In general, w is the width of interpupillary distance E. However, in actual application, w may be different because the optical design takes into account process factors. The diamond-shaped areas (e.g., AB, BC) are a so-called reviewing zone, and the width of the viewing zone may be set as w. Thus, along the line ABC and with a plane at a distance of (f+z) from the display panel, there can be formed many diamond-shaped viewing zones. For a particular display apparatus, the width of the viewing zone (e.g., the diamond-shaped areas AB and BC) may be fixed.

The number of compensated electrodes k in a slit grating period is calculated by Formula (4):

$$k = \frac{s}{w} * \Delta * h \quad (4)$$

where $\Delta$ represents the position variation; s represents a total number of electrodes within a slit grating period; w represents the width of a viewing zone; and h represents the preset scale factor. Due to limitation of detection speed, there is a deviation between the space position of the viewer at the current time and the actual position of the viewer, as well as the space position of the viewer at the previous time and the actual position of the viewer, therefore the value of h may be set in a range of 0.1 to 1.44.

It should be noted that, when using the direction sensor, the space position of the viewer at the current time may be obtained by Formula (3) based on an optimum viewing distance when designing a display panel and a rotation angle of the display panel. Or the space position is calibrated using the image acquiring device, and then the space position of the viewer at the current time is calculated by Formula (3) based on the calibration position and the rotation angle of the display panel.

Returning to FIG. 3, the second calculation module 42 is configured to, based on the space position of the viewer at the current time and the number of compensated electrodes, calculate a total number of electrodes to be shifted.

Figure 4:
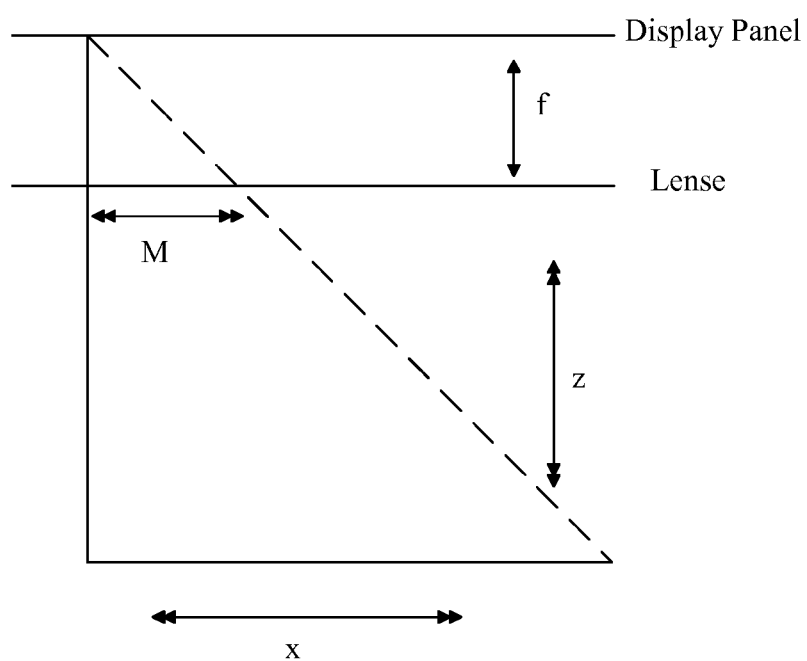
FIG. 4 illustrates a schematic diagram of an exemplary movement of a slit grating consistent with the disclosed embodiments.

FIG. 4 illustrates a schematic diagram of an exemplary movement of a slit grating consistent with the disclosed embodiments. As shown in FIG. 4, the second calculation module 42 may calculate a total number of electrodes to be shifted N by Formula (5):

$$N = \frac{M}{u} + k = \frac{x * f}{(f+z) * u} + k \quad (5)$$

where x represents a space position of a viewer at the current time (i.e., $C_{pos}$); z represents a distance between the position of the viewer at the current time and the slit grating; f represents a distance between the slit grating and pixel plane of the display panel; u represents the width of an electrode of the slit grating; and k represents a total number of compensated electrodes in a slit grating period.

The electrode voltage regulator module 43 is configured to, based on the number of electrodes to be shifted, regulate electrode voltage to move the slit grating.

As used herein, the movement of the slit grating refers to the shift of the electrodes in the slit grating, i.e., after the number of electrodes to be shifted N is obtained, a circular shift is implemented for open or close status of electrodes in a slit grating period. The status of an electrode refers to open status of the electrode or close status of the electrode. The circular shift is the operation of open or close status of electrodes in a slit grating period, either by changing the status of the final electrode to the status of the first electrode, while changing the status of all electrodes within a slit grating period according to the position variation, or by performing the inverse operation. The circular shift is a special kind of cycle, which in turn is a special kind of permutation. During this process, the opening ratio of the dynamic slit grating is not changed. For example, if a slit grating period comprises six electrodes and the open or close status of the 6 electrodes (1 represents on; 0 represents off) is 111100, when N=1, after implementing movement of the slit grating, the open or close status of the 6 electrodes is changed to 011110; when N=2, the open or close status of the 6 electrodes is changed to 001111; when N=3, the open or close status of the 6 electrodes is changed to 100111; and so on.

Figure 6:
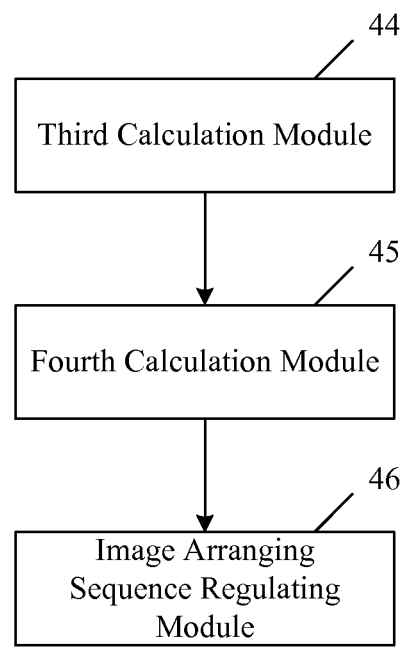
FIG. 6 illustrates a schematic diagram of another exemplary implementation of an adjusting device consistent with the disclosed embodiments.

FIG. 6 illustrates a schematic diagram of another exemplary implementation of an adjusting device consistent with the disclosed embodiments. As shown in FIG. 6, when the adjusting device 4 adjusts image arranging units of the stereoscopic display image, the adjusting device 4 may include a third calculation module 44, a fourth calculation module 45, and an image arranging sequence regulating module 46.

The third calculation module 44 is configured to, based on the position variation, calculate a shift number of one image arranging unit in a viewing zone.

The third calculation module 44 may calculate the shift number k of the image arranging unit in a viewing zone based on the position variation by Formula (6):

$$k = \frac{s}{w} * \Delta * h \quad (6)$$

where $\Delta$ represents a position variation; s represents the width of the image arranging unit; w represents the width of a viewing zone; and h represents a preset scale factor. As shown in FIG. 5, in general, w is the width of interpupillary distance E. However, in actual application, w may be different because the optical design takes into account process factors. Due to limitation of detection speed, there is a deviation between the space position of the viewer at the current time and the actual position of the viewer, as well as the space position of the viewer at the previous time and the actual position of the viewer, therefore the value of h is set in a range of 0~10 sub-pixels, for example, h can be 0, 1, 2, 3, 4, 5, 6, 7, 8, 9, or 10 sub-pixels.

The fourth calculation module 45 is configured to, based on the space position of the viewer at the current time and the shift number of the image arranging unit, calculate a total number of the image arranging units to be shifted.

The fourth calculation module 45 may calculate a total number of image arranging units to be shifted N by Formula (7):

$$N = \frac{x * f}{(f + z) * u} + k \quad (7)$$

where x represents a space position of the viewer at the current time; z represents a distance between the position of the viewer at the current time and a slit grating; f represents a distance between the slit grating and the pixel plane of the display panel; u represents the width of an image arranging unit of a display unit; and k represents the shift number of one image arranging unit in a viewing zone.

It should be noted that, when using the direction sensor, the space position of the viewer at the current time may be obtained by Formula (3) based on an optimum viewing distance when designing a display panel and a rotation angle of the display panel. Or the space position is calibrated using the image acquiring device, and then the space position of the viewer at the current time is calculated by Formula (3) based on the calibration position and the rotation angle of the display panel.

The image arranging sequence regulating module 46 is configured to, based on the number of the image arranging units to be shifted, adjust the image arranging sequence to implement the shift of the image arranging units.

Figure 7:
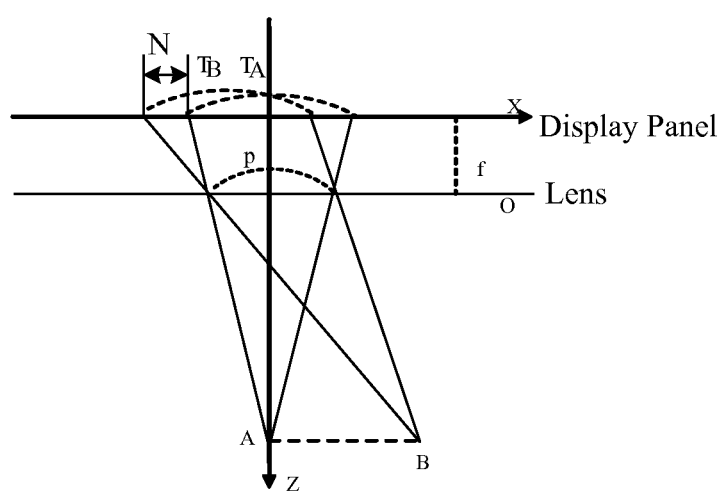
FIG. 7 illustrates a schematic diagram of an exemplary movement of a display unit consistent with the disclosed embodiments.

FIG. 7 illustrates a schematic diagram of an exemplary movement of a display unit consistent with the disclosed embodiments. As shown in FIG. 7, P represents a distance between centers of two adjacent lenses, f represents a distance between a slit grating and a pixel plane of the display panel of the stereo display apparatus, and points "A" and "B" represent projection centers corresponding to different space positions of the viewers, respectively. The projection center is a center of a view zone, and is also the center of an imaginary line between the left eye and the right eye of the viewer. The implementation of shift of the image arranging units refers to every image arranging unit of the stereoscopic image performs a shift operation, i.e., after obtaining the number of image arranging units to be shifted N, a shift operation is performed for every image arranging unit in each image arranging unit period. As used herein, the point "A" and the point "B" are on a horizontal line which is X-axis parallel to the display panel. The space position of the viewer moves from the point "A" to the point "B", which means the viewer moves from the point "A" to the point "B" along the X-axis. Accordingly, the display unit moves from the point TA to TB.

Figure 8:
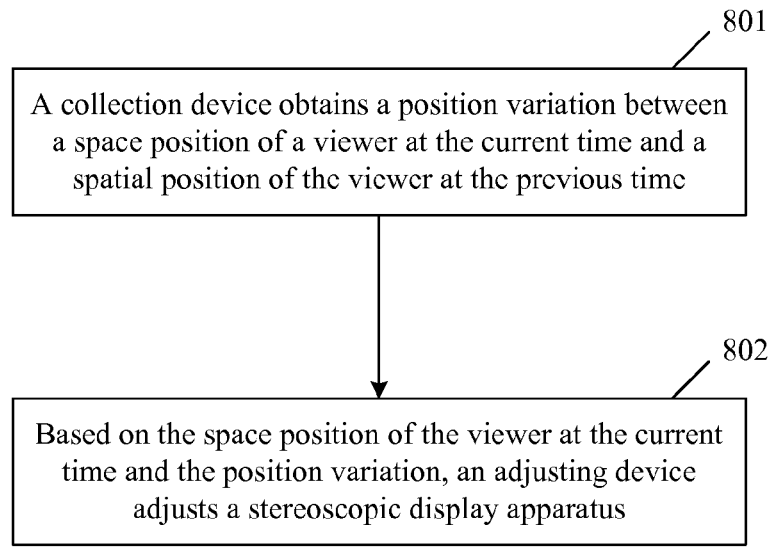
FIG. 8 illustrates a flow diagram of an exemplary stereoscopic display control method consistent with the disclosed embodiments.

FIG. 8 illustrates a flow diagram of an exemplary stereoscopic display control method consistent with the disclosed embodiments. As shown in FIG. 8, the control method may include the following steps.

Step 801: a collection device obtains a position variation between a space position of a viewer at the current time and a space position of the viewer at the previous time. The position variation is an offset of parallel translation of the space position of the viewer relative to a display panel.

The collection device may be an image acquiring device or a direction sensor. When the collection device is an image acquiring device, the position variation is obtained by Formula (1); when the collection device is a direction sensor, the position variation is obtained by Formulas (2) and (3).

Step 802: based on the space position of the viewer at the current time and the position variation, an adjusting device adjusts the stereoscopic display apparatus.

Two methods may be used to adjust the stereoscopic display apparatus. The adjusting device may adjust electrodes that drive a dynamic slit grating of the spectral device. The adjusting device may also adjust image arranging units of the stereoscopic display image.

When the adjusting device adjusts the electrodes that drive the dynamic slit grating of the stereoscopic display apparatus, Step 802 may include:

S11: based on the position variation, a first calculation module calculates the number of compensated electrodes in a slit grating period. The number of compensated electrodes may be calculated in a slit grating period by Formula (4).

S12: based on the space position of the viewer at the current time and the number of compensated electrodes, a second calculation module calculates the number of electrodes to be shifted. The number of electrodes to be shifted may be calculated by Formula (5).

S13: based on the number of electrodes to be shifted, an electrode voltage regulator module regulates electrode voltage, thereby moving the slit grating.

When the adjusting device adjusts image arranging units of the stereoscopic display image, Step 802 may include:

S21: based on the position variation, a third calculation module calculates the shift number of one image arranging unit in a viewing zone. Based on the position variation, the shift number of one image arranging unit in a viewing zone may be calculated by Formula (6).

S22: based on the space position of the viewer at the current time and the shift number of one image arranging unit, the fourth calculation module calculates the number of image arranging units to be shifted. The number of image arranging units to be shifted may be calculated by Formula (7).

S23: based on the number of the image arranging units to be shifted, an image arranging sequence regulating module adjusts the image arranging sequence to implement the shift of the image arranging units.

Thus, when stereoscopic display apparatus is adjusted based on tracking data, not only the current space position of the viewer but also a variation of the current space position relative to the previous space position (including a variation direction and a variation value) are considered, thus reducing the "jitter" phenomenon of stereoscopic image and improving viewer's viewing effect.

It should be noted that, in the above stereoscopic display apparatus, each functional unit is listed only for illustrative purposes. In practical applications, the above functions are implemented by different functional units according to the needs. That is, the internal structure of the stereoscopic display apparatus is divided into different functional units to complete all or part of the functions described above.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A method for controlling stereoscopic display, comprising:

obtaining, by a collection device, a position variation between a space position of a viewer at current time and a space position of the viewer at previous time, wherein the position variation is an offset of parallel translation of the space position of the viewer relative to a display panel; and adjusting, by an adjusting device, a stereoscopic display apparatus based on the space position of the viewer at the current time and the position variation, wherein adjusting the stereoscopic display apparatus based on the space position of the viewer at the current time and the position variation further includes:

calculating a total number of compensated electrodes in a slit grating period based on the position variation:

calculating a total number of electrodes to be shifted based on the space position of the viewer at the current time and the number of compensated electrodes, wherein the total number of electrodes to be shifted is larger than the total number of compensated electrodes in the slit grating period: and adjusting electrode voltage to move the slit grating by the total number of electrodes to be shifted;

wherein:

calculating the number of compensated electrodes k in a slit grating period by:

$$k = \frac{s}{w} * \Delta * h$$

wherein $\Delta$ represents a position variation; s represents a total number of electrodes within a slit grating period; w represents the width of a viewing zone; and h represents a preset scale factor, calculating the number of electrodes to be shifted N by:

$$N = \frac{x * f}{(f + z) * u} + k$$

wherein x represents a space position of a viewer at the current time; z represents a distance between the position of the viewer at the current time and the slit grating; f represents a distance between the slit grating and a pixel plane of the display panel; u represents the width of an electrode of the slit grating; and k represents a total number of compensated electrodes in a slit grating period.

2. The method according to claim 1, wherein:
the collection device is at least one of an image acquiring device and a direction sensor.

3. The method according to claim 1, wherein:
the value of h is set in a range of 0.1 to 1.44.

4. A stereoscopic display apparatus, comprising:
a display panel configured to display images;
a collection device including at least one of an image acquiring device and a direction sensor: and
one or more processors, memory, and one or more program units stored in the memory and to be executed by the one or more processors, the one or more program units comprises a processing device and an adjusting device,
wherein the collection device is configured to:
obtain viewers' position information and a deflection angle of the display panel; and
provide the obtained position information and the obtained deflection angle to the processing device;
the processing device is configured to obtain a position variation between a space position of a viewer at current time and the space position of the viewer at previous time by using the collection device, wherein the position variation is an offset of parallel translation of the viewer's space position relative to the display panel; and
the adjusting device is configured to, based on the viewer's space position at the current time and the position variation, adjust the stereoscopic display apparatus,
wherein the adjusting device further includes:
a first calculation module configured to calculate a total number of compensated electrodes in a slit grating period based on the position variation;
a second calculation module configured to calculate a total number of electrodes to be shifted based on the space position of the viewer at the current time and the number of compensated electrodes; and an electrode voltage regulator module configured to regulate electrode voltage to move the slit grating by the number of electrodes to be shifted;

wherein:

the first calculation module calculates a total number of compensated electrodes k in a slit grating period by:

$$k = \frac{s}{w} * \Delta * h$$

wherein $\Delta$ represents a position variation; s represents a total number of electrodes within a slit grating period; w represents the width of a viewing zone: and h represents a preset scale factor, The second calculation module calculates the number of electrodes to be shifted N by:

$$N = \frac{x * f}{(f+z) * u} + k$$

wherein x represents a space position of a viewer at the current time; z represents a distance between the position of the viewer at the current time and the slit grating; f represents a distance between the slit grating and a pixel plane of the display panel; u represents the width of an electrode of the slit grating; and k represents a total number of compensated electrodes in a slit grating period.

5. The apparatus according to claim 4, wherein the collection device includes:

the image acquiring device and the direction sensor, wherein the image acquiring device is configured to:
obtain an image sequence of a viewer; and
provide the obtained image sequence to the processing device; and the direction sensor is configured to:
obtain a deflection angle of the display panel; and
provide the obtained deflection angle to the processing device.

6. The apparatus according to claim 4, wherein:
the value of h is set in a range of 0.1 to 1.44.

\* \* \* \* \*